United States Patent
Taneda et al.

(10) Patent No.: US 11,473,986 B2
(45) Date of Patent: Oct. 18, 2022

(54) STRESS DETECTION DEVICE

(71) Applicant: NHK Spring Co., Ltd., Yokohama (JP)

(72) Inventors: Hiroyuki Taneda, Kanagawa (JP);
Kenichiro Tami, Kanagawa (JP);
Minoru Komiya, Kanagawa (JP)

(73) Assignee: NHK Spring Co., Ltd., Yokohama (JP)

(*) Notice: Subject to any disclaimer, the term of this patent is extended or adjusted under 35 U.S.C. 154(b) by 0 days.

(21) Appl. No.: 17/414,493

(22) PCT Filed: Dec. 2, 2019

(86) PCT No.: PCT/JP2019/047094
§ 371 (c)(1),
(2) Date: Jun. 16, 2021

(87) PCT Pub. No.: WO2020/137374
PCT Pub. Date: Jul. 2, 2020

(65) Prior Publication Data
US 2022/0065713 A1    Mar. 3, 2022

(30) Foreign Application Priority Data
Dec. 28, 2018    (JP) .............................. JP2018-248444

(51) Int. Cl.
*G01L 1/12*    (2006.01)
*G01L 5/00*    (2006.01)
*G01L 5/04*    (2006.01)

(52) U.S. Cl.
CPC ............ *G01L 1/125* (2013.01); *G01L 5/0028* (2013.01); *G01L 5/0057* (2013.01); *G01L 5/04* (2013.01)

(58) Field of Classification Search
CPC ..... G01L 1/125; G01L 5/0028; G01L 5/0057; G01L 5/04; G01L 1/127; G01L 5/0047
See application file for complete search history.

(56) References Cited

U.S. PATENT DOCUMENTS 4,765,192 A * 8/1988 Hase ...................... G01L 3/102
73/862.336
5,007,295 A    4/1991 Gustafsson et al.
(Continued)

FOREIGN PATENT DOCUMENTS

CN    1253622 A    5/2000
CN    102692287 A    9/2012
(Continued)

OTHER PUBLICATIONS

Supplementary European Search Report dated Aug. 24, 2022, issued for European Patent Application No. 19905287.9.
(Continued)

*Primary Examiner* — Freddie Kirkland, III
(74) *Attorney, Agent, or Firm* — Locke Lord LLP

(57) ABSTRACT

A stress detection device includes: a first detector including a first magnetostrictive member configured to be deformed by tensile stress or compression stress in accordance with a load from outside, and a first wound portion made of a conductive material and configured to be wound around the first magnetostrictive member; and a second detector including a second magnetostrictive member having a magnetostrictive constant different from a magnetostrictive constant of the first magnetostrictive member, the second magnetostrictive member being configured to be deformed by tensile stress or compression stress in accordance with a load from outside, and a second wound portion made of a conductive material and configured to be wound around the second magnetostrictive member, wherein the first detector and the second detector are configured to electrically detect strength of magnetic permeability due to compression stress or tensile stress, and output detection signals having opposite signals.

5 Claims, 4 Drawing Sheets

(56) References Cited

U.S. PATENT DOCUMENTS

| | | | | |
|---|---|---|---|---|
| 5,703,298 | A | * | 12/1997 | Odachi .................. G01L 3/102 73/862.333 |
| 5,905,210 | A | * | 5/1999 | O'Boyle ................ G01L 1/127 177/144 |
| 6,345,544 | B1 | | 2/2002 | Mizuno et al. |
| 6,658,942 | B1 | | 12/2003 | Faesch |
| 6,823,746 | B2 | * | 11/2004 | Viola ..................... G01L 3/105 73/862.335 |
| 7,104,137 | B2 | * | 9/2006 | Baudendistel ........... G01L 9/16 73/722 |
| 7,622,918 | B2 | * | 11/2009 | Cripe .................... G01R 33/04 73/862.331 |
| 7,640,814 | B2 | * | 1/2010 | Cripe .................... G01L 3/102 73/862.331 |
| 8,692,545 | B2 | | 4/2014 | Shimada et al. |
| 2004/0007083 | A1 | | 1/2004 | Viola et al. |
| 2004/0050181 | A1 | * | 3/2004 | Shimizu ................. G01L 3/102 73/862.331 |
| 2007/0034021 | A1 | | 2/2007 | Cripe |
| 2007/0069723 | A1 | | 3/2007 | Cripe |
| 2013/0220024 | A1 | | 8/2013 | Osborne |

FOREIGN PATENT DOCUMENTS

| | | |
|---|---|---|
| CN | 103292933 A | 9/2013 |
| CN | 108955958 A | 12/2018 |
| EP | 0964232 A1 | 12/1999 |
| JP | H06-137981 A | 5/1994 |
| JP | H06-241920 A | 9/1994 |
| JP | H11-208320 A | 8/1999 |
| JP | H11-241955 A | 9/1999 |
| JP | 2004-184189 A | 7/2004 |
| JP | 2008-241613 A | 10/2008 |
| JP | 2010-038913 A | 2/2010 |

OTHER PUBLICATIONS

Office Action dated Sep. 1, 2022, issued for the corresponding Chinese patent application No. 201980085970.7 and English translation thereof.

* cited by examiner stress detection device

STRESS DETECTION DEVICE

FIELD

The present invention relates to a stress detection device.

BACKGROUND

Conventionally, a current collector (pantograph) on a roof of a train is in contact with a train line, and electrical energy is supplied from the train line. In order to stabilize the power supply to the train, tension of the train line is desired to be constant. Furthermore, since the tension of the train line changes depending on temperature and wear, a balancer adjusts the tension to be constant. A stress detection device detects the tension of the train line (e.g., see Patent Literature 1). In Patent Literature 1, change in magnetic permeability is detected by a coil provided around a magnetostrictive portion, and tension is determined from the detected magnetic permeability.

CITATION LIST

Patent Literature

Patent Literature 1: JP H11-208320 A

SUMMARY

Technical Problem

By the way, in order to improve the accuracy of tension measurement, a stress detection device capable of detecting stress with higher accuracy is desired.

The present invention has been made in view of the above, and an object thereof is to provide a stress detection device capable of detecting stress with high accuracy.

Solution to Problem

To solve the above-described problem and achieve the object, a stress detection device according to the present invention includes: a first detector including a first magnetostrictive member configured to be deformed by tensile stress or compression stress in accordance with a load from outside, and a first wound portion made of a conductive material and configured to be wound around the first magnetostrictive member; and a second detector including a second magnetostrictive member having a magnetostrictive constant different from a magnetostrictive constant of the first magnetostrictive member, the second magnetostrictive member being configured to be deformed by tensile stress or compression stress in accordance with a load from outside, and a second wound portion made of a conductive material and configured to be wound around the second magnetostrictive member, wherein the first detector and the second detector are configured to electrically detect strength of magnetic permeability due to compression stress or tensile stress, and output detection signals having opposite signals.

Moreover, in the above-described stress detection device according to the present invention, the first detector and the second detector are connected in series.

Moreover, in the above-described stress detection device according to the present invention, the first detector is configured to electrically detect the strength of magnetic permeability due to the compression stress, and the second detector is configured to electrically detect the strength of magnetic permeability due to the tensile stress.

Moreover, in the above-described stress detection device according to the present invention, a magnetostrictive constant of the first magnetostrictive member and a magnetostrictive constant of the second magnetostrictive member have signs different from each other.

Moreover, the above-described stress detection device according to the present invention, further includes a signal processor configured to perform differential amplification on the detection signals output by the first detector and the second detector.

Advantageous Effects of Invention

According to the present invention, an effect that stress can be detected with high accuracy is exhibited.

DESCRIPTION OF EMBODIMENTS

Hereinafter, an embodiment for carrying out the present invention will be described in detail with reference to the drawings. Note that the present invention is not limited by the following embodiment. Furthermore, each of the figures referred to in the following description merely schematically illustrates the shape, size, and positional relation to the extent that the content of the present invention can be understood. That is, the present invention is not limited to the shape, size, and positional relation exemplified in each figure.

Figure 1:
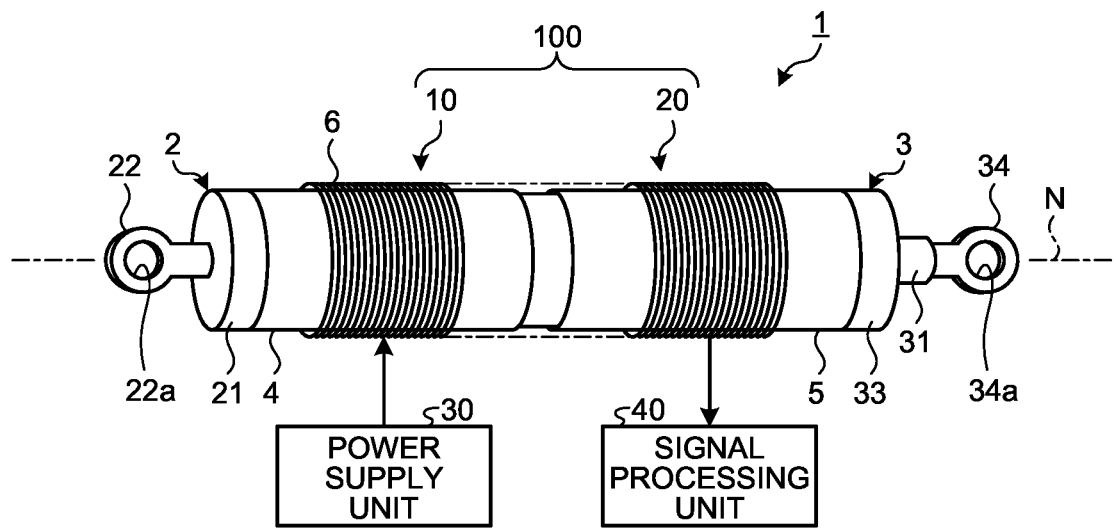
FIG. 1 is a perspective view illustrating a schematic configuration of a stress detection device according to one embodiment of the present invention.
Figure 2:
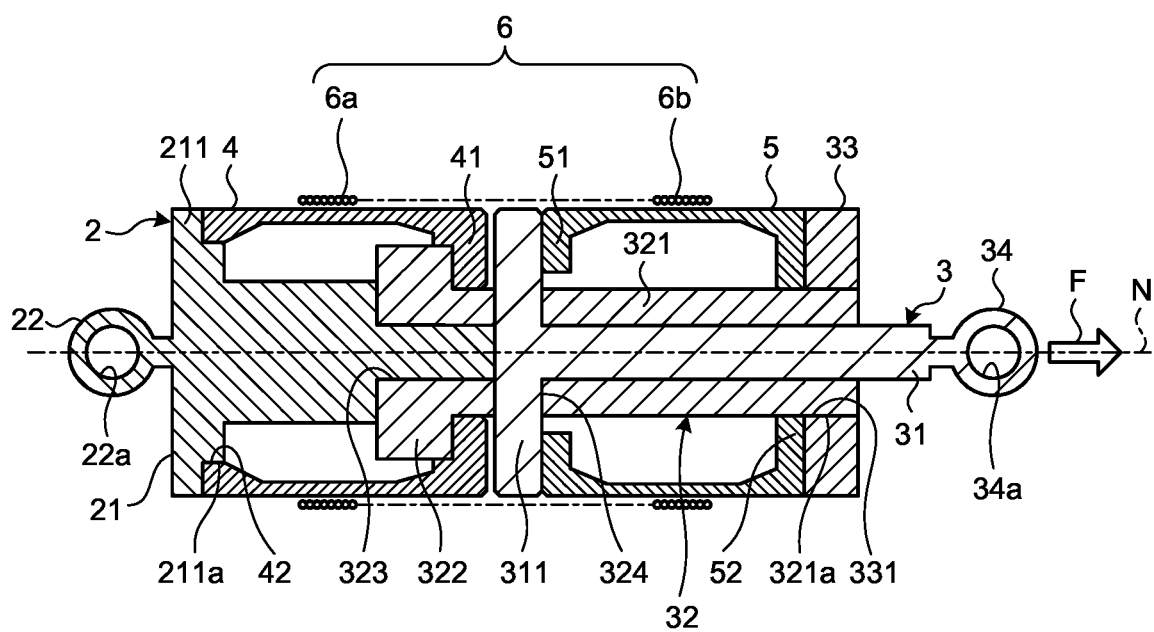
FIG. 2 is a cross-sectional view of the stress detection device in FIG. 1.

FIG. 1 is a perspective view illustrating a schematic configuration of a stress detection device according to one embodiment of the present invention. FIG. 2 is a cross-sectional view of the stress detection device in FIG. 1. FIG. 2 is a cross-sectional view in which a plane parallel to a central axis N of a stress detection device 1 in FIG. 1 and passing through the central axis N corresponds to a cut surface. Hereinafter, in FIGS. 1 and 2, description is given with the definition of the left side in a central axis N direction as one end and the right side as the other end.

A stress detection device 1 includes a first member 2, a second member 3, a first magnetostrictive member 4, a second magnetostrictive member 5, and coils 6. One end of the first member 2 is fixed at the time of detecting stress. The second member 3 is provided side by side with the first member 2 along the central axis N, and the other end of the second member 3 is connected to an object to be measured at the time of detecting stress. The first magnetostrictive member 4 has a tubular shape. The first member 2 and a part of the second member 3 are inserted into the first magnetostrictive member. The second magnetostrictive member 5 has a tubular shape. The second member 3 is inserted into the second magnetostrictive member 5. The coils 6 are wound around the outer peripheries of the first magnetostrictive member 4 and the second magnetostrictive member 5. Furthermore, a power supply unit 30 and a signal processing unit 40 are connected to the stress detection device 1. The power supply unit 30 supplies power to the coil 6. The signal processing unit 40 is electrically connected to the coil 6. The signal processing unit 40 calculates the strength and change of magnetic permeability due to internal magnetization by processing a detection signal acquired from the coil 6, and outputs the calculation result.

The first member 2 is formed of, for example, a metal material. The first member 2 includes a main body portion 21 and a fixing portion 22. The main body portion 21 extends in the central axis N direction. The fixing portion 22 continues to one end of the main body portion 21, and is to be fixed at the time of use (detecting stress). A flange portion 211 screwed with the first magnetostrictive member 4 is formed at an end of the main body portion 21 on the side of the fixing portion 22. A hole portion 22a that locks with an object to be fixed is formed in the fixing portion 22.

The second member 3 is formed of, for example, a metal material. The second member 3 includes a first main body portion 31, a second main body portion 32, a clamping portion 33, and a fixing portion 34. The first main body portion 31 extends in the central axis N direction. The second main body portion 32 is provided on the outer periphery of the first main body portion 31. The clamping portion 33 clamps the second magnetostrictive member 5 together with the first main body portion 31. The fixing portion 34 continues to the other end of the first main body portion 31. An object to be detected is connected with the fixing portion 34 at the time of use. A hole portion 34a into which an object to be detected locks is formed in the fixing portion 34.

A first flange portion 311 that abuts on the second magnetostrictive member 5 is formed at an end on the side of one end of the first main body portion 31.

The second main body portion 32 includes a tubular portion 321 and a second flange portion 322. The tubular portion 321 extends in a tubular shape. The second flange portion 322 is provided at an end on the side of one end of the tubular portion 321. The second flange portion 322 protrudes on the outer peripheral side of the tubular portion 321, and abuts on the first magnetostrictive member 4.

Furthermore, a first through hole 323 and a second through hole 324 are formed in the second main body portion 32. The first through hole 323 penetrates in the central axis N direction. The second through hole 324 penetrates in a direction orthogonal to the central axis N.

The first main body portion 31 is inserted through the first through hole 323. Note that, although a part of the first member 2 is inserted through the first through hole 323 in FIG. 2, a part of the first member 2 is not required to be inserted through the first through hole 323. From the viewpoint that the first member 2 and the second member 3 extend in the central axis N direction, a part of the first member 2 is preferably inserted through the first through hole 323.

The first flange portion 311 extends to the outside of the second main body portion 32 through the second through hole 324.

The clamping portion 33 has a hollow columnar shape. A screw portion 331 screwed with a screw portion 321a of the tubular portion 321 is provided on an inner peripheral surface of the clamping portion 33. The clamping portion 33 clamps the second magnetostrictive member 5 with the first flange portion 311.

The first magnetostrictive member 4 is formed of a magnetostrictive material. The first magnetostrictive member 4 includes a first diameter-reduced portion 41 and a screw portion 42. The first diameter-reduced portion 41 is provided on the side of the other end, and protrudes to an inner peripheral side. The screw portion 42 is provided on the side of one end, and screwed with a screw portion 211a of the main body portion 21.

The second magnetostrictive member 5 is formed of a magnetostrictive material having a magnetostrictive constant different from that of the first magnetostrictive member 4. The second magnetostrictive member 5 includes a second diameter-reduced portion 51 and a third diameter-reduced portion 52. The second diameter-reduced portion 51 is provided on the side of one end, and protrudes to the inner peripheral side. The third diameter-reduced portion 52 is provided on the side of the other end, and protrudes to the inner peripheral side.

The first magnetostrictive member 4 and the second magnetostrictive member 5 may be formed of a soft magnetic material as long as the soft magnetic material has, for example, magnetostrictive characteristics.

The coil 6 is formed of a conductive material. The coil 6 includes a first wound portion 6a and a second wound portion 6b. The first wound portion 6a is provided on the side of one end, and wound around the first magnetostrictive member 4. The second wound portion 6b is provided on the side of the other end, and wound around the second magnetostrictive member 5.

The power supply unit 30 supplies power to the coil 6.

Furthermore, the coil 6 is electrically connected to the signal processing unit 40, and outputs a detection signal for detecting change in the internal magnetization of the magnetostrictive member (here, strength of magnetic permeability) to the signal processing unit 40.

The stress detection device 1 constitutes a tensile stress detector 10 and a compression stress detector 20. The tensile stress detector 10 detects the strength of magnetic permeability due to tensile stress by using the first member 2, the second flange portion 322, the first magnetostrictive member 4, and the first wound portion 6a at the time of use (detecting stress). The compression stress detector 20 detects the strength of magnetic permeability due to compression stress by using the second member 3, the second magnetostrictive member 5, and the second wound portion 6b except the second flange portion 322. The tensile stress detector 10 and the compression stress detector 20 constitute a detector 100 that electrically detects the strength of magnetic permeability for stress detection.

Furthermore, when the stress detection device 1 is used, the fixing portion 22 is fixed to a balancer (not illustrated) of a train, and the fixing portion 34 is connected to a train line (not illustrated).

Figure 3:
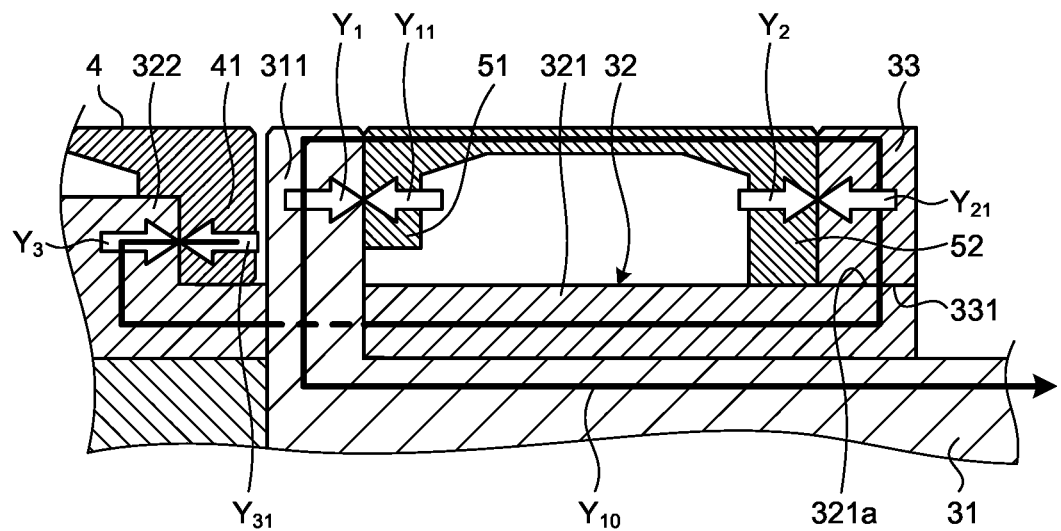
FIG. 3 illustrates a flow line of stress in the stress detection device in FIG. 1.

FIG. 3 illustrates a flow line of stress in the stress detection device in FIG. 1. When a tensile load F (see FIG.

2) is applied to the fixing portion 34 in the stress detection device 1, the first main body portion 31 is pulled by the load.

At this time, the first flange portion 311 applies a load $Y_1$ to the side of the other end to the second diameter-reduced portion 51 of the second magnetostrictive member 5. At this time, the load (load $Y_1$) applied to the second diameter-reduced portion 51 causes the third diameter-reduced portion 52 to apply a load $Y_2$ to the side of the other end to the clamping portion 33.

When the load (load $Y_2$) is applied to the clamping portion 33, the tubular portion 321 is pulled to the side of the other end, and the second flange portion 322 is also pulled to the side of the other end. At this time, the second flange portion 322 applies a load $Y_3$ to the side of the other end to the first diameter-reduced portion 41.

When a tensile load is applied, reaction force $Y_{11}$ from the second diameter-reduced portion 51 is applied to the load $Y_1$. Similarly, reaction force $Y_{21}$ from the clamping portion 33 is applied to the load $Y_2$, and reaction force $Y_{31}$ from the first diameter-reduced portion 41 is applied to the load $Y_3$.

In this way, in the stress detection device 1, the above-described load allows a flow line to which stress is applied to be represented by one flow line $Y_{10}$.

When the fixing portion 34 is pulled and the above-described load is applied to the stress detection device 1 with the coil 6 being excited, tensile stress is generated in the first magnetostrictive member 4, and compression stress is generated in the second magnetostrictive member 5. When the tensile stress and compression stress are generated, the strength of internal magnetization is changed by a reverse magnetostrictive effect in the first magnetostrictive member 4 and the second magnetostrictive member 5. The stress detection device 1 detects the strength of internal magnetization due to tensile stress and/or compression stress. In the present embodiment, detection signals output from the tensile stress detector 10 and the compression stress detector 20 have signs opposite to each other. Noise may be superimposed on the detection signals in a transmission path. The noise has the same signs in a detection signal from the tensile stress detector 10 and a detection signal from the compression stress detector 20. The signs here refer to the positive or negative of a detected value.

Figure 4:
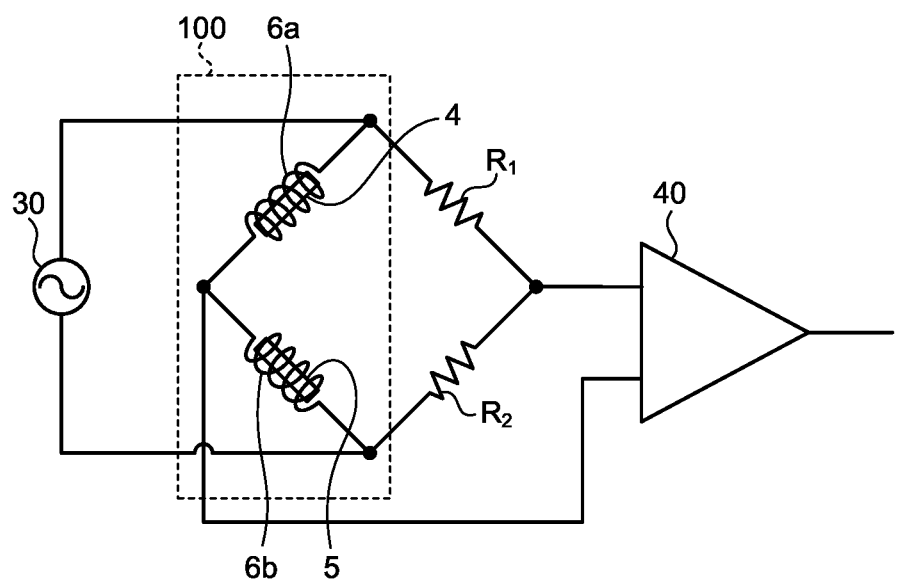
FIG. 4 is a circuit diagram of the stress detection device in FIG. 1.

FIG. 4 is a circuit diagram of the stress detection device in FIG. 1. In the present embodiment, the first wound portion 6a and the second wound portion 6b are connected in series. It can be said from the connection aspect of the first wound portion 6a and the second wound portion 6b and a flow line (flow line $Y_{10}$) to which stress is applied as described above that tensile stress detector 10 and the compression stress detector 20 are connected in series.

Connecting the tensile stress detector 10 and the compression stress detector 20 in series can equalize stress applied to each detector (magnetostrictive member).

Furthermore, an end opposite to a side connected to the second wound portion 6b of the first wound portion 6a and an end opposite to a side connected to the first wound portion 6a of the second wound portion 6b are connected to the power supply unit 30 while connected to reference resistors $R_1$ and $R_2$, respectively.

The signal processing unit 40 includes at least a differential amplifier. In the present embodiment, detection signals having signs opposite to each other and a signal containing noise having the same signs are input to the signal processing unit 40. The signal processing unit 40 performs differential amplification processing on the input signal. Inputting detection signals having signs (positive and negative) opposite to each other and noise having the same signs allows cancellation (attenuation) of noise superimposed in a transmission path and amplification of a detection signal to be used for measurement.

In the signal processing unit 40 or an external arithmetic device, tension of a train line is measured by using the change in magnetic permeability (change amount or change rate) determined from the signal after the differential amplification. The tension of the train line is monitored and maintained at an appropriate level by the measured tension.

Figure 5A:
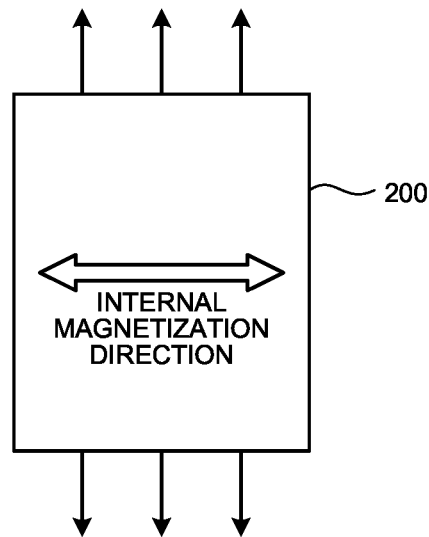
FIG. 5A illustrates an internal magnetization direction when tensile stress is applied to a member having a negative magnetostrictive constant.
Figure 5B:
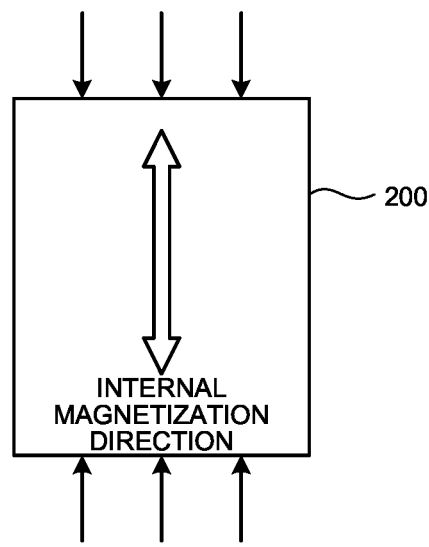
FIG. 5B illustrates the internal magnetization direction when compression stress is applied to a member having a negative magnetostrictive constant.

Subsequently, changes in internal magnetization of a magnetostrictive member will be described with reference to FIGS. 5A, 5B, 6A, and 6B. FIG. 5A illustrates an internal magnetization direction when tensile stress is applied to a member having a negative magnetostrictive constant. FIG. 5B illustrates the internal magnetization direction when compression stress is applied to a member having a negative magnetostrictive constant.

When tensile stress is generated in a member 200 having a negative magnetostrictive constant, the internal magnetization direction becomes perpendicular to the tensile stress (see FIG. 5A). In contrast, when compression stress is generated in the member 200, the internal magnetization direction becomes parallel to the compression stress (see FIG. 5B). Examples of the member 200 having a negative magnetostrictive constant include nickel.

Figure 6A:
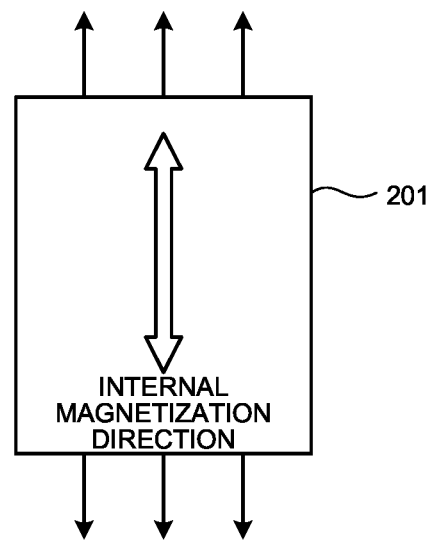
FIG. 6A illustrates the internal magnetization direction when tensile stress is applied to a member having a positive magnetostrictive constant.
Figure 6B:
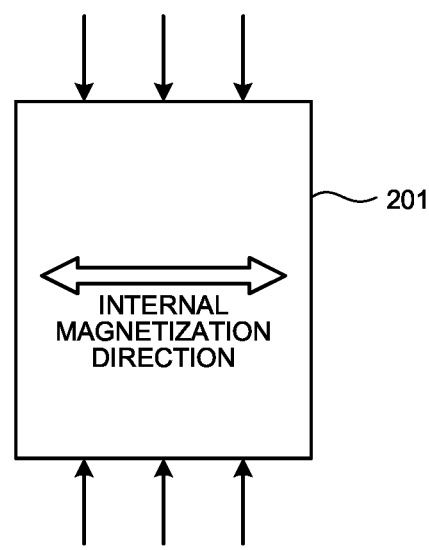
FIG. 6B illustrates the internal magnetization direction when compression stress is applied to a member having a positive magnetostrictive constant.

FIG. 6A illustrates the internal magnetization direction when tensile stress is applied to a member having a positive magnetostrictive constant. FIG. 6B illustrates the internal magnetization direction when compression stress is applied to a member having a positive magnetostrictive constant.

When tensile stress is generated in a member 201 having a positive magnetostrictive constant, the internal magnetization direction becomes parallel to the tensile stress (see FIG. 6A). In contrast, when compression stress is generated in the member 201, the internal magnetization direction becomes perpendicular to the compression stress (see FIG. 6B). Examples of the member 201 having a positive magnetostrictive constant include iron.

A material used for the first magnetostrictive member 4 and the second magnetostrictive member 5 described above preferably has a small coercive force. For example, when the coercive force with respect to tensile stress and compression stress changes depending on the positive or negative of the magnetostrictive constant, a material that reduces the coercive force is preferably combined with each stress. For example, a side to which tensile stress is applied may be defined as a negative magnetostrictive constant, and a side to which compression stress is applied may be defined as a positive magnetostrictive constant in a combination of magnetostrictive constants. Setting in which signs of the magnetostrictive constants are different may be adopted.

In the above-described embodiment, the stress detection device 1 includes the tensile stress detector 10 and the compression stress detector 20, and change in magnetic permeability is output by differential amplification processing of the signal processing unit 40. The tensile stress detector 10 detects change in magnetic permeability due to tensile stress. The compression stress detector 20 detects change in magnetic permeability due to compression stress. In the embodiment, change in magnetic permeability due to tensile stress and compression stress can be acquired as an increase in gain while noise is removed. According to the embodiment, stress can be detected with high accuracy.

Furthermore, according to the above-described embodiment, the durability of the stress detection device 1 can be improved compared to, for example, a conventional load cell by forming the first member 2, the second member 3, the first magnetostrictive member 4, and the second magnetostrictive member 5 with a metal material.

Furthermore, according to the above-described embodiment, the stress detection device 1 has a simple structure formed by metal working, and thus no special working is required for manufacturing. Thus, the stress detection device 1 can be manufactured at a lower cost than a device having equivalent performance.

Note that, although, in the above-described embodiment, a configuration having two detectors that detect different stresses has been described, a detector configuration is not limited thereto. The two detectors include a detector that detects compression stress and a detector that detects tensile stress. For example, each of two detectors may detect tensile stress, or may detect compression stress. Furthermore, the number of detectors is not limited to two, and three or more detectors may be provided. In the case of a configuration having three or more detectors, stress detected by each detector may be set to any of compression stress and tensile stress. In this case, the magnetostrictive constants of magnetostrictive members of the detectors are different from each other.

Furthermore, although an example in which the compression stress detector and the tensile stress detector are connected in series has been described in the above-described embodiment, the compression stress detector and the tensile stress detector may be connected in parallel.

Furthermore, although an example in which differential amplification processing is performed on a detection result (signal) of the compression stress detector and a detection result (signal) of the tensile stress detector has been described in the above-described embodiment, either one of the detection results may be adopted as an object to be output. When one of the detection results is adopted, the signal processing unit 40 includes an arithmetic circuit different from an amplification amplifier, and adopts and outputs a detection result having a smaller noise level, for example.

As described above, the present invention may include various embodiments not described here, and various design changes and the like can be made without departing from the technical idea specified by the claims. Although an example in which tension of a train line is detected (measured) has been described in the above-described embodiment, the stress detection device 1 can be adopted to an object to be measured for which the tension of a wire rod is measured.

INDUSTRIAL APPLICABILITY

As described above, the stress detection device according to the present invention is suitable for detecting stress with high accuracy.

REFERENCE SIGNS LIST

1 STRESS DETECTION DEVICE
2 FIRST MEMBER
3 SECOND MEMBER
4 FIRST MAGNETOSTRICTIVE MEMBER
5 SECOND MAGNETOSTRICTIVE MEMBER
6 COIL
6a FIRST WOUND PORTION
6b SECOND WOUND PORTION
21 MAIN BODY PORTION
22, 34 FIXING PORTION
30 POWER SUPPLY UNIT
31 FIRST MAIN BODY PORTION
32 SECOND MAIN BODY PORTION
33 CLAMPING PORTION
40 SIGNAL PROCESSING UNIT

The invention claimed is:

1. A stress detection device comprising:
   a first detector including
      a first magnetostrictive member configured to be deformed by tensile stress or compression stress in accordance with a load from outside, and
      a first wound portion made of a conductive material and configured to be wound around the first magnetostrictive member; and
   a second detector including
      a second magnetostrictive member having a magnetostrictive constant different from a magnetostrictive constant of the first magnetostrictive member, the second magnetostrictive member being configured to be deformed by tensile stress or compression stress in accordance with a load from outside, and
      a second wound portion made of a conductive material and configured to be wound around the second magnetostrictive member,
   wherein the first detector and the second detector are configured to
      electrically detect strength of magnetic permeability due to compression stress or tensile stress, and
      output detection signals having opposite signals.

2. The stress detection device according to claim 1, wherein the first detector and the second detector are connected in series.

3. The stress detection device according to claim 1, wherein
   the first detector is configured to electrically detect the strength of magnetic permeability due to the compression stress, and
   the second detector is configured to electrically detect the strength of magnetic permeability due to the tensile stress.

4. The stress detection device according to claim 1, wherein a magnetostrictive constant of the first magnetostrictive member and a magnetostrictive constant of the second magnetostrictive member have signs different from each other.

5. The stress detection device according to claim 1, further comprising
   a signal processor configured to perform differential amplification on the detection signals output by the first detector and the second detector.

* * * * *